US008725187B2

(12) United States Patent
Christensen et al.

(10) Patent No.: US 8,725,187 B2
(45) Date of Patent: *May 13, 2014

(54) METHOD, APPARATUS AND SYSTEM FOR IMPROVING CELL SEARCH AND SYNCHRONIZATION IN A CELLULAR COMMUNICATION SYSTEM BY USING NON-CIRCULARITY OF SIGNAL STATISTICS

(71) Applicant: Renesas Mobile Corporation, Tokyo (JP)

(72) Inventors: Lars Christensen, Charlottenlund (DK); Carsten Juncker, Herlev (DK)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/777,386

(22) Filed: Feb. 26, 2013

(65) Prior Publication Data
US 2013/0165106 A1    Jun. 27, 2013

Related U.S. Application Data

(63) Continuation of application No. 13/301,924, filed on Nov. 22, 2011, now Pat. No. 8,385,961.

(30) Foreign Application Priority Data

Nov. 10, 2011    (GB) .................................. 1119437.0

(51) Int. Cl.
*H04B 7/00*    (2006.01)

(52) U.S. Cl.
USPC ..................... 455/513; 455/67.11; 455/115.1; 455/434; 455/515; 455/115.3; 370/324; 370/350; 370/503

(58) Field of Classification Search
USPC ........ 455/67.13, 115.1, 115.3, 434, 515, 513, 455/432.1–453, 524–526; 370/331–332, 370/503, 510–511, 324, 328, 329, 338, 342
See application file for complete search history.

(56) References Cited

U.S. PATENT DOCUMENTS

| 6,112,095 | A  | * | 8/2000 | Wax et al. ................. 455/456.1 |
| 7,079,988 | B2 | * | 7/2006 | Albera et al. ................ 702/196 |

(Continued)

FOREIGN PATENT DOCUMENTS

| WO | WO 2008/058150 A2 | * | 5/2008 |
| WO | WO-2009/039211 A1 |   | 3/2009 |

(Continued)

OTHER PUBLICATIONS

"A Generalized Likelihood Ratio Test for Impropriety of Complex Signals", IEEE Signal Processing Letters, vol. 13, No. 7 (Jul. 2006) by Peter J. Schreier, et al.*

(Continued)

*Primary Examiner* — Olumide T Ajibade Akonai
*Assistant Examiner* — Babar Sarwar
(74) *Attorney, Agent, or Firm* — Stanton IP Law

(57) ABSTRACT

There are provided measures for cell search and synchronization. Such measures may exemplarily comprise acquiring an observation signal for a carrier signal on a carrier which is under consideration for synchronization with a desired cellular system, calculating a power measure of the observation signal, which indicates a received power of said carrier signal, calculating a non-circularity measure of the observation signal, which indicates a non-circularity of said carrier signal, and calculating a ranking measure, which indicates an applicability of said carrier for synchronization with the desired cellular system, based on the calculated power measure and the calculated non-circularity measure.

19 Claims, 5 Drawing Sheets

(56) References Cited

U.S. PATENT DOCUMENTS

2007/0189259 A1* 8/2007 Sollenberger et al. ........ 370/342
2008/0095108 A1* 4/2008 Malladi et al. ................ 370/329
2011/0319116 A1* 12/2011 Iwamura et al. ............. 455/517

FOREIGN PATENT DOCUMENTS

WO    WO-2010/031725 A1    3/2010
WO    WO 2011/038243 A2 *    3/2011

OTHER PUBLICATIONS

International Search Report and Written Opinion for Application No. PCT/IB2012/002047; dated Feb. 28, 2013.

Schreier, P.J., et al.; "*A Generalized Likelihood Ratio Test for Impropriety of Complex Signals*", IEEE Signal Processing Letters; vol. 13, No. 7; Jul. 2006.

Search and Examination Report for Application No. GB 1119437.0 dated Mar. 20, 2012.

\* cited by examiner

METHOD, APPARATUS AND SYSTEM FOR IMPROVING CELL SEARCH AND SYNCHRONIZATION IN A CELLULAR COMMUNICATION SYSTEM BY USING NON-CIRCULARITY OF SIGNAL STATISTICS

CROSS-REFERENCE TO RELATED APPLICATION

This application is a continuation of U.S. application Ser. No. 13/301,924, filed on Nov. 22, 2011, which claims the benefit of and priority to United Kingdom patent application number 1119437.0, filed on Nov. 10, 2011.

FIELD OF THE INVENTION

The present invention relates to cell search and synchronization. More specifically, the present invention relates to measures (including methods, apparatuses and computer program products) for cell search and synchronization in a cellular system using non-circularity of signal statistics.

BACKGROUND

In the field of mobile communication systems, particularly cellular communication systems, one issue relates to cell search and synchronization. Such cell search and synchronization is to be performed by any terminal for connecting to a cellular system and for ensuring terminal mobility within a cellular system, i.e. a cell thereof, either when powering up the terminal or when transiting from an idle mode to a connected mode or when transiting from one cell to another cell.

The speed with which cell search and synchronization can be performed by a terminal is important for both end-user experience and the resulting power consumption of the terminal. For the end user, increased synchronization time and power consumption means reduced standby time and significantly prolonged establishment of the cellular connection with the cellular system. Therefore, the (initial) cell search and synchronization is an important aspect of the network performance and end-user experience. This is why it is typically considered to be critical to ensure that the terminal's (initial) synchronization time is a low as possible as well as the idle mode power consumption.

Conventionally, cell search and synchronization procedures typically rely on a power-based ranking of carrier signals being broadcasted on specific carriers (such as synchronization signals being broadcasted on specific synchronization channels), which are received at a terminal trying to re-/connect to a cellular system. Specifically, it is known that the terminal calculates RSSI measures for available carrier signals of specific carriers, ranks the carriers based on the RSSI measures thereof, and executes a cell search and synchronization procedure based on the carrier ranking starting with the carrier having the highest ranking.

Such conventional cell search and synchronization procedures are efficient in terms of synchronization time and power consumption as long as it is ensured that all available (i.e. received) carriers or carrier signals are relevant for the cell search and synchronization purpose. Hence, such conventional cell search and synchronization procedures are sufficient in deployment scenarios in which only a single cellular system operates on a specific frequency range/band which is monitored by terminals for connecting to this cellular system.

However, in recent and future mobile communication systems, particularly cellular communication systems, there will increasingly be in practice deployment scenarios in which multiple cellular systems operate on a specific frequency range/band. For example, such deployment scenarios are resulting from 3G frequency re-farming activities, e.g. the introduction of WCDMA services on the GSM band, LTE frequency re-farming activities, and the like. Hence, a terminal in such deployment scenario is likely to experience networks with one or more of GSM, 3G, 3.5G, CDMA, WCDMA, TD-SCDMA, and LTE/LTE-A carriers co-existing in a specific frequency range/band.

Such deployment scenarios are problematic in terms of efficiency of conventional cell search and synchronization procedures. This is essentially because the carriers and carrier signals may not be distinguished regarding their origin from or belonging to a specific cellular system. Hence, the RSSI-ranked carrier list will be disrupted by carriers of non-desired cellular systems, i.e. those cellular systems which the terminal does actually not desire to connect to. As a result of such disrupted conventional RSSI ranking, the terminal may firstly attempt to execute a cell search and synchronization procedure based on a carrier which originates from or belongs to a cellular system other than that desired to be connected to. Such attempt will naturally fail, and a further attempt of cell search and synchronization will have to be executed based on the next carrier in the ranking, until a relevant carrier of the desired cellular system is reached.

When assuming that the available carriers distinctively belong to coexisting 2G and 3G network, such disruption goes in both directions, i.e. a terminal synchronizing to a BS/BTS in a network containing both 2G and 3G carriers on the same frequency band will be impacted both when attempting synchronization to the 2G network and to the 3G network. Having additional carriers for other cellular systems will further increase such disruptions.

Accordingly, every time the terminal attempts to synchronize to a non-desired cellular carrier, it wastes synchronization time and idle mode power.

Therefore, the application of conventional cell search and synchronization procedures in deployment scenarios with multiple carriers from different cellular systems coexisting in a given frequency range/band will adversely result in increased synchronization time and power consumption.

In view thereof, there exist problems in terms of efficiency (e.g. regarding synchronization time and power consumption) in the context of cell search and synchronization in a cellular system, in particular in a deployment scenario in which multiple carriers of different cellular system coexist within the same frequency range/band.

Thus, there is a need to further improve cell search and synchronization in a cellular system.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising acquiring an observation signal for a carrier signal on a carrier which is under consideration for synchronization with a desired cellular system, calculating a power measure of the observation signal, which indicates a received power of said carrier signal, calculating a non-circularity measure of the observation signal, which indicates a non-circularity of said carrier signal, and calculating a ranking measure, which indicates an applicability of said carrier for synchronization with the desired cellular system, based on the calculated power measure and the calculated non-circularity measure.

According to an exemplary aspect of the present invention, there is provided an apparatus comprising at least one processor, at least one memory including computer program code, and at least one interface configured for communication with at least another apparatus, the at least one processor, with the at least one memory and the computer program code, being configured to cause the apparatus to perform: acquiring an observation signal for a carrier signal on a carrier which is under consideration for synchronization with a desired cellular system, calculating a power measure of the observation signal, which indicates a received power of said carrier signal, calculating a non-circularity measure of the observation signal, which indicates a non-circularity of said carrier signal, and calculating a ranking measure, which indicates an applicability of said carrier for synchronization with the desired cellular system, based on the calculated power measure and the calculated non-circularity measure.

According to an exemplary aspect of the present invention, there is provided a computer program product including comprising computer-executable computer program code which, when the program is run on a computer (e.g. a computer of an apparatus according to the aforementioned apparatus-related exemplary aspect of the present invention), is configured to cause the computer to carry out the method according to the aforementioned method-related exemplary aspect of the present invention.

Such computer program product may comprise or be embodied as a (tangible) computer-readable (storage) medium or the like on which the computer-executable computer program code is stored, and/or the program may be directly loadable into an internal memory of the computer or a processor thereof.

Advantageous further developments or modifications of the aforementioned exemplary aspects of the present invention are set out in the following description of drawings.

By way of exemplary embodiments of the present invention, there is provided an improvement in cell search and synchronization. More specifically, by way of exemplary embodiments of the present invention, there are provided measures and mechanisms for improved cell search and synchronization in a cellular system, in particular in a deployment scenario in which multiple carriers of different cellular system coexist within the same frequency range/band, using non-circularity of signal statistics.

Thus, improvement is achieved by methods, apparatuses and computer program products enabling an improved cell search and synchronization using non-circularity of signal statistics.

BRIEF DESCRIPTION OF DRAWINGS

For a more complete understanding of exemplary embodiments of the present invention, reference is now made to the following description taken in connection with the accompanying drawings in which.

DETAILED DESCRIPTION

Figure 1:
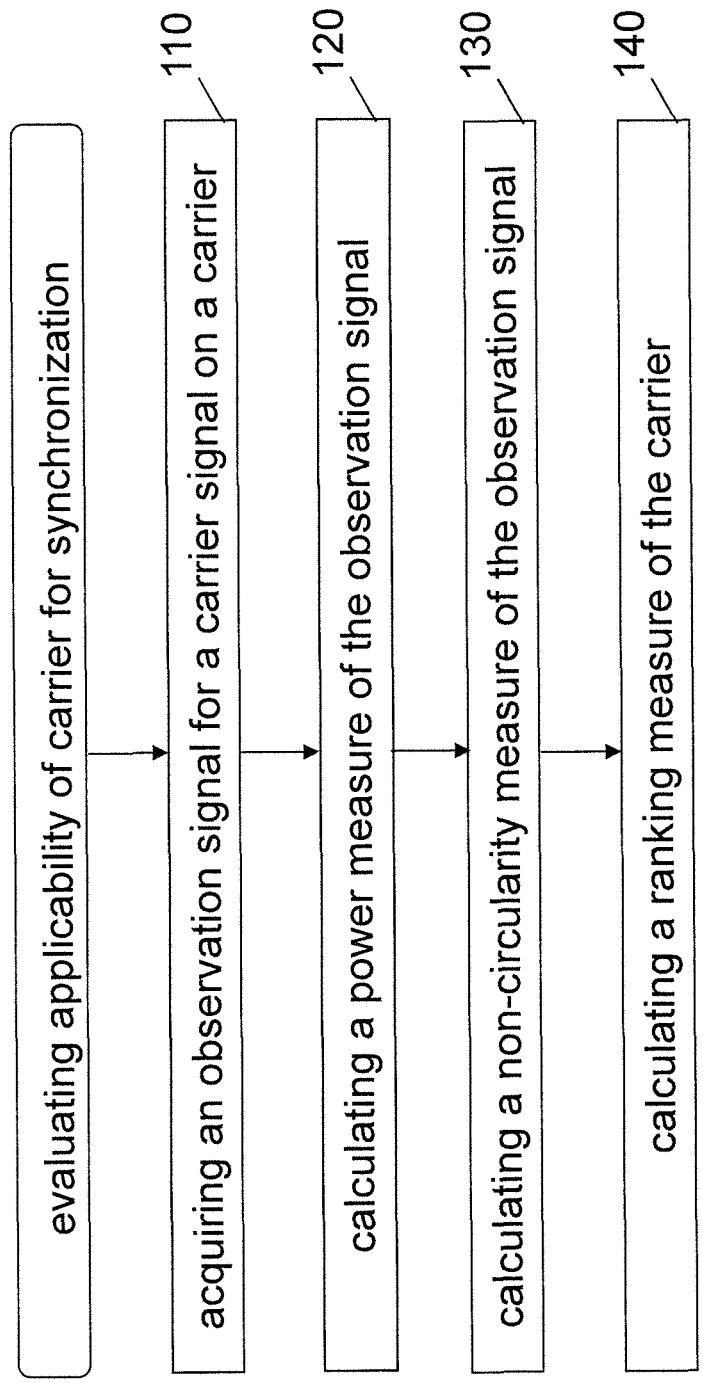
FIG. 1 shows a flowchart illustrating a procedure for evaluating an applicability of a carrier for synchronization according to exemplary embodiments of the present invention.

Exemplary aspects of the present invention will be described herein below. More specifically, exemplary aspects of the present are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following exemplary description mainly refers to specifications being used as non-limiting examples for certain exemplary network configurations and deployments. In particular, for the applicability of thus described exemplary aspects and embodiments, GSM- and 3G/3.5G/LTE-related cellular communication networks are used as non-limiting examples. As such, the description of exemplary aspects and embodiments given herein specifically refers to terminology which is directly related thereto. Such terminology is only used in the context of the presented non-limiting examples, and does naturally not limit the invention in any way. Rather, any other communication systems, network configurations or system deployments, etc. may also be utilized as long as compliant with the features described herein.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

According to exemplary embodiments of the present invention, in general terms, there are provided mechanisms, measures and means for cell search and synchronization in a cellular system, in particular in a deployment scenario in which multiple carriers of different cellular systems coexist within the same frequency range/band, using non-circularity of signal statistics.

In general terms, exemplary embodiments of the present invention basically provide for an improved evaluation of an applicability of a carrier for synchronization with a desired cellular system and, thus, an improved ranking of carriers in terms of their applicability for synchronization with the desired cellular system.

According to exemplary embodiments of the present invention, an improved ranking measure is proposed for the context of cell search and synchronization, which modifies a power measure relating to a carrier signal by means of a non-circularity measure relating to the carrier signal. Stated in other words, the ranking measure is not a conventional power measure but a conventional power measure being modified by incorporating knowledge of non-circular statistics relating to the carrier signal. Such non-circular statistics may for example show up or exist in the complex plane or any other space over which signal precoding is done. Non-limiting examples of signals exhibiting such non-circular statistics include signals based on the use of real-valued modulations (e.g. BPSK, GMSK) or signal precoding like transmit diversity schemes.

Accordingly, any non-circular statistics may be exploited, which may exist in synchronization signals of a given cellular system, to either up- or down-prioritize specific carriers in the cell search and synchronization procedure based on a measure of their non-circularity. As a result, the proposed ranking measure is effective for speeding up the cell search and synchronization (and thus saving power consumption), since it enables to distinguish between carriers regarding their origin from or belonging to a specific cellular system, and it thus enables to give priority to those carriers that are more likely to hold the signals of the desired cellular system.

In this regard, it is utilized that carrier and/or synchronization signals of different cellular systems (i.e. different types, standards, releases, specifications, etc. of cellular systems) exhibit different properties in terms of non-/circularity, i.e. non-circular statistics in the complex plane or any other space over which signal precoding is done, e.g. due to the use of different modulation schemes and/or signal precoding like transmit diversity using e.g. Alamouti precoding.

An example of a system that possesses non-circular statistics in the complex plane is a GSM system, which is due to the use of GMSK modulation. Examples of systems that may possess circular statistics in the complex plane are 3G, 3.5G, CDMA, WCDMA, TD-SCDMA, HSPA, LTE, and LTE-A systems. However, LTE and LTE-Advanced also represent examples of systems that possess non-circularity due to signal precoding when using transmit diversity schemes. Such systems as mentioned above are used as non-limiting examples for the subsequent description.

As a result of exemplary embodiments of the present invention, a better measure of the likelihood that a given carrier is e.g. a GSM signal is possible, and this can be used to up-prioritize (i.e. privilege or favor) the carrier in question in the GSM synchronization procedure, whereas it can be down-prioritized (i.e. penalized) in another system's synchronization procedure, e.g. a synchronization procedure of a 3G system or the like.

Accordingly, exemplary embodiments of the present invention specifically but not exclusively relate to 3GPP cellular systems such as GSM, 3G, 3.5G, WCDMA, HSPA, and LTE, as well as non-3GPP cellular systems such as CDMA and TD-SCDMA.

Generally, exemplary embodiments of the present invention are applicable to (initial) cell search and synchronization of all cellular systems which are either known or expected to coexist (with e.g. GSM or LTE) on the same frequency range/band, either now or in the future.

In the following, exemplary embodiments of the present invention are described with reference to methods, procedures and functions, as well as with reference to structural arrangements and configurations.

It is to be noted that, although processing based on linear and conjugate-linear operations is exemplarily described in the following, equivalent functionality may be accomplished based on operations working directly on the real and imaginary parts of the signal.

The methods, procedures and functions described hereinafter mainly relate to a terminal side, which may include a mobile station (MS) or a user equipment (UE) or a modem (which may be installed as part of a MS or UE, but may be also a separate module or a chip or a chipset, which can be attached to various devices). Such terminal or modem is configured to be operable in a given frequency range/band in which multiple cellular systems may coexist, i.e. in which carriers of different cellular system may occur.

Generally, it is to be noted that, when reference is made herein to a terminal, MS or UE, such reference is equally applicable to a modem (which may be installed as part of a MS or UE, but may be also a separate module or a chip or a chipset, which can be attached to various devices).

FIG. 1 shows a flowchart illustrating a procedure for evaluating an applicability of a carrier for synchronization according to exemplary embodiments of the present invention.

As shown in FIG. 1, a corresponding procedure according to exemplary embodiments of the present invention comprises an operation of acquiring (110) an observation signal for a carrier signal on a carrier which is under consideration for synchronization with a desired cellular system, an operation of calculating (120) a power measure of the observation signal, which indicates a received power of the carrier signal, an operation of calculating (130) a non-circularity measure of the observation signal, which indicates a non-circularity of the carrier signal, and an operation of calculating (140) a ranking measure, which indicates an applicability of the carrier for synchronization with the desired cellular system, based on the calculated power measure and the calculated non-circularity measure.

In the following, scalars, vectors and matrices are used, which are denoted in a common notation. That is, non-bold non-capital letters indicate scalars, bold non-capital letters indicate column vectors, and bold capital letters indicate matrices, and $(\bullet)^*$, $(\bullet)^T$ and $(\bullet)^H$ indicate the conjugate, transpose and conjugate-transpose of a vector or matrix, respectively.

An acquisition of the observation signal for such carrier signal considered for an (initial) synchronization procedure may result in a complex-valued observation signal which can be expressed by $$y = [y_0^T \ldots y_{M-1}^T]^T$$

wherein $y_0^T \ldots y_{M-1}^T$ represent the M vector-sample values taken over the considered observation signal. The dimensionality of the vector-samples is N, i.e. the length of $y_m$ is given by N with m=[0 . . . M−1]. If necessary, the observation signal may be preconditioned in a manner that suits the target of extracting/estimating non-circular statistics, e.g. by a suitable derotation for GSM signals.

For determining a non-circularity measure of the observation signal (i.e. the observation samples), one conceivable way assumed herein is based on a likelihood ratio.

For example, such determination based on a likelihood ratio may be realized on a Generalized Likelihood Ratio Test (GLRT), such as that described in P. J. Schreier, L. L. Scharf, A. Hanssen, "A Generalized Likelihood Ratio Test for Impropriety of Complex Signals", IEEE Signal Processing Letters, Vol. 13, No. 7, July 2006. To compute such a likelihood ratio, it is convenient to define an augmented observation vector z containing also the conjugate observations as given by $$z \triangleq [y^T, y^H]^T$$

Based on the observation samples, a sample covariance matrix $\hat{\Gamma}$ and a complementary sample covariance matrix $\hat{c}$ are given as $$\hat{\Gamma} = \frac{1}{M} \sum_{m=0}^{M-1} y_m y_m^H$$

$$\hat{C} = \frac{1}{M} \sum_{m=0}^{M-1} y_m y_m^T$$

Using these definitions, an augmented sample covariance matrix $\hat{R}$ of the augmented observation vector z is given as $$\hat{R} = \frac{1}{M} \sum_{m=0}^{M-1} z_m z_m^H = \begin{bmatrix} \hat{\Gamma} & \hat{C} \\ \hat{C}^* & \hat{\Gamma}^* \end{bmatrix}$$

Based on the augmented sample covariance matrix it, the negative log-likelihood ratio for the hypothesis that the observations are circularly distributed, $\lambda \triangleq -\ln(L(\hat{R}))$, may serve as one example of a non-circularity measure. According to the aforementioned article, this negative log-likelihood ratio may be computed as $$\lambda \triangleq -\ln(L(\hat{R})) = -\frac{M}{2} \ln\left(\frac{\det(\hat{R})}{(\det(\hat{\Gamma}))^2}\right) = -\frac{M}{2} \ln\left(\frac{\det(\hat{\Gamma} - \hat{C}\hat{\Gamma}^{-*}\hat{C}^*)}{\det(\hat{\Gamma})}\right)$$

where $\ln(\ )$ indicates the natural logarithm, with $L(\hat{R})$ indicating the likelihood ratio of the hypotheses of circularity vs. that of non-circularity.

If a structure is present in the (carrier) signal in question, that gives rise to a constrained covariance estimation problem, this constraint should be included in the covariance estimates used for evaluating the likelihood ratio test. In that case, the likelihood ratio test should be performed based on the constrained covariance matrix estimates and not the sample covariance matrices directly. The simplest example of such a constrained covariance matrix estimation results when the estimation is constrained so that the covariance matrices are known to be given by a scalar parameter multiplied by an identity matrix. Such a covariance matrix estimation constraint could for example originate from an expectation that the (wireless) communication channel is a frequency-flat channel. When the covariance matrices have this special structure, the negative log-likelihood ratio may be found as $$\lambda = -\frac{M}{2} \ln\left(\frac{\det\left(\hat{\gamma}I - \frac{|\hat{c}|^2}{\hat{\gamma}}I\right)}{\det(\hat{\gamma}I)}\right) = -\frac{M}{2} \ln\left(1 - \frac{|\hat{c}|^2}{\hat{\gamma}^2}\right)$$

with the constrained covariance estimates given by $$\hat{\gamma} \triangleq \frac{1}{N} tr\{\hat{\Gamma}\}$$

$$\hat{c} \triangleq \frac{1}{N} tr\{\hat{C}\}$$

where $tr\{\bullet\}$ is the trace operator returning the sum of the diagonal elements.

More generally, constrained covariance estimation may be achieved via commonly known methods of spectral estimation with the resulting constrained covariance estimates being used as inputs to the likelihood ratio test.

The power measure of such an observation signal, which is a common measure used in conventional carrier ranking, may be represented by a normal RSSI measure, the calculation of which may be expressed by $$RSSI \triangleq \frac{1}{M} \sum_{m=0}^{M-1} \|y_m\|^2 = \frac{1}{N} tr\{\hat{\Gamma}\} = \hat{\gamma}$$

Based on a computed RSSI measure and a computed non-circularity measure, a modified ranking procedure may be established according to exemplary embodiments of the present invention, which is capable of accounting for the presence of non-circular statistics.

Figure 2:
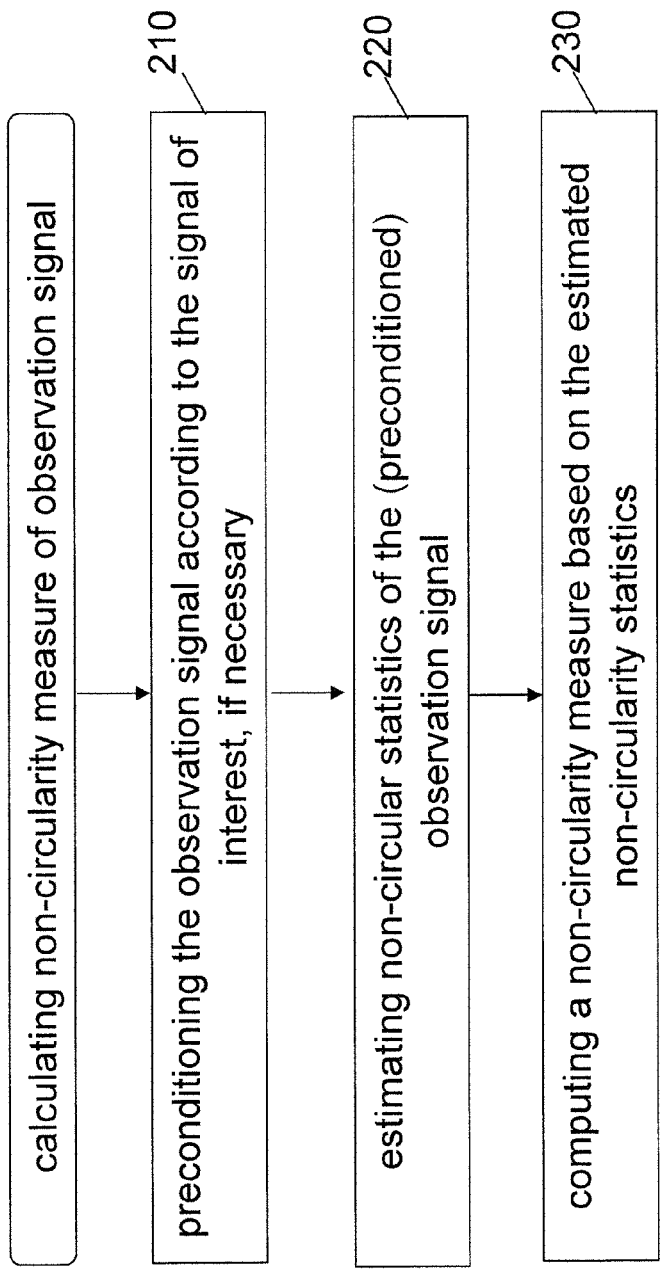
FIG. 2 shows a flowchart illustrating a procedure for calculating a non-circularity measure of an observation signal according to exemplary embodiments of the present invention.

FIG. 2 shows a flowchart illustrating a procedure for calculating a non-circularity measure of an observation signal according to exemplary embodiments of the present invention. Such procedure may correspond to the operation 130 according to FIG. 1.

As shown in FIG. 2, a corresponding procedure according to exemplary embodiments of the present invention comprises an operation of (suitably) preconditioning (210) the observation signal in accordance with a modulation scheme of the carrier signal, namely the signal structure of the signal of interest (e.g. a cell search and/or synchronization signal of a given cellular system), an operation of estimating (220) non-circular statistics of the preconditioned observation signal, and an operation of computing (230) a non-circularity measure based on the estimated non-circular statistics.

According to exemplary embodiments of the present invention, the aforementioned preconditioning operation is not necessarily required (when the observation signal as such is already suitably (pre-)conditioned. Namely, such preconditioning of the observation signal may only be performed, if necessary (when the observation signal is to be adapted to the signal structure of the signal of interest). Such preconditioning may for example be accomplished by way of e.g. a derotation for GSM signals or a FFT for LTE signals. Without the preconditioning being performed, the subsequent operations of estimating and computing are performed on the observation signal as such (instead of the preconditioned observation signal).

According to exemplary embodiments of the present invention, the aforementioned computing operation may be based on a likelihood ratio test as outlined above.

For the subsequent explanation of such a procedure, two examples are assumed. The first example considers a case in which a GSM carrier signal is received at a terminal, and the second example considers a case in which a LTE carrier signal is received at a terminal.

In the following, an exemplary description for the case of a GSM carrier signal is given.

For this example, a version of the observation signal coming from the antenna system, $\tilde{y}_m$, is derotated according to the GSM-typical GMSK modulation. The preconditioned signal used in the subsequent processing can therefore be expressed by $$y_m \triangleq e^{-j\frac{\pi}{2}m} \tilde{y}_m$$

with j being the imaginary unit.

For simplicity, it is here assumed that the observation signal is sampled at one sample per symbol (while this is not required). Such derotation according to the GMSK modulation of the GSM carrier signal is effective in order to estimate the non-circular statistics of the GMSK carrier signal in the complex plane. Without such derotation, the non-circularity thereof could not be seen as the subsequently described estimation process is to be aligned with the transmission to capture the stationarity of the non-circular process.

Based on this preconditioned observation signal, a measure of the non-circular statistics may then be estimated by means of a likelihood ratio test based on the covariance matrix $\hat{\Gamma}$ and the complementary covariance matrix $\hat{C}$, as described in general terms above.

In the following, an exemplary description for the case a LTE carrier signal is given.

In modern wireless systems like LTE, multiple transmit antennas may be employed allowing the use of transmit diversity schemes for improved reliability, e.g. Alamouti precoding. Using such transmit diversity precoding, the (preconditioned) observation signal $y_m$ of the precoded block number m may be described as $$y_m = H(P_L x_m + P_{CL} x_m^*) + e_m$$

where H represent the MIMO channel transfer function, $x_m$ is the vector of data symbols before precoding, $P_L$ and $P_{CL}$ are the linear and conjugate-linear precoders, i.e. precoding functions, respectively, and $e_m$ is the additive noise.

Since this form of precoding involves sending linear and conjugate-linear versions of the data symbols, the transmitted signal may exhibit non-circular statistics. In LTE, such a form of transmit diversity may be used that performs precoding over the space-frequency domain. The (preconditioned) observation vector $y_m$ should therefore be set up so as to span the space over which the precoding is performed, e.g. two neighboring OFDM sub-carriers.

Based on this observation signal (which may be preconditioned by e.g. a derotation operation or an FFT operation), a measure of the non-circular statistics may be estimated by means of a likelihood ratio test based on the covariance matrix $\hat{\Gamma}$ and the complementary covariance matrix $\hat{C}$, as described in general terms above.

For both exemplary cases described above, the next step is then to compute a non-circularity measure based on the estimated non-circularity statistics and to calculate a ranking measure of the carrier based thereon.

Figure 3:
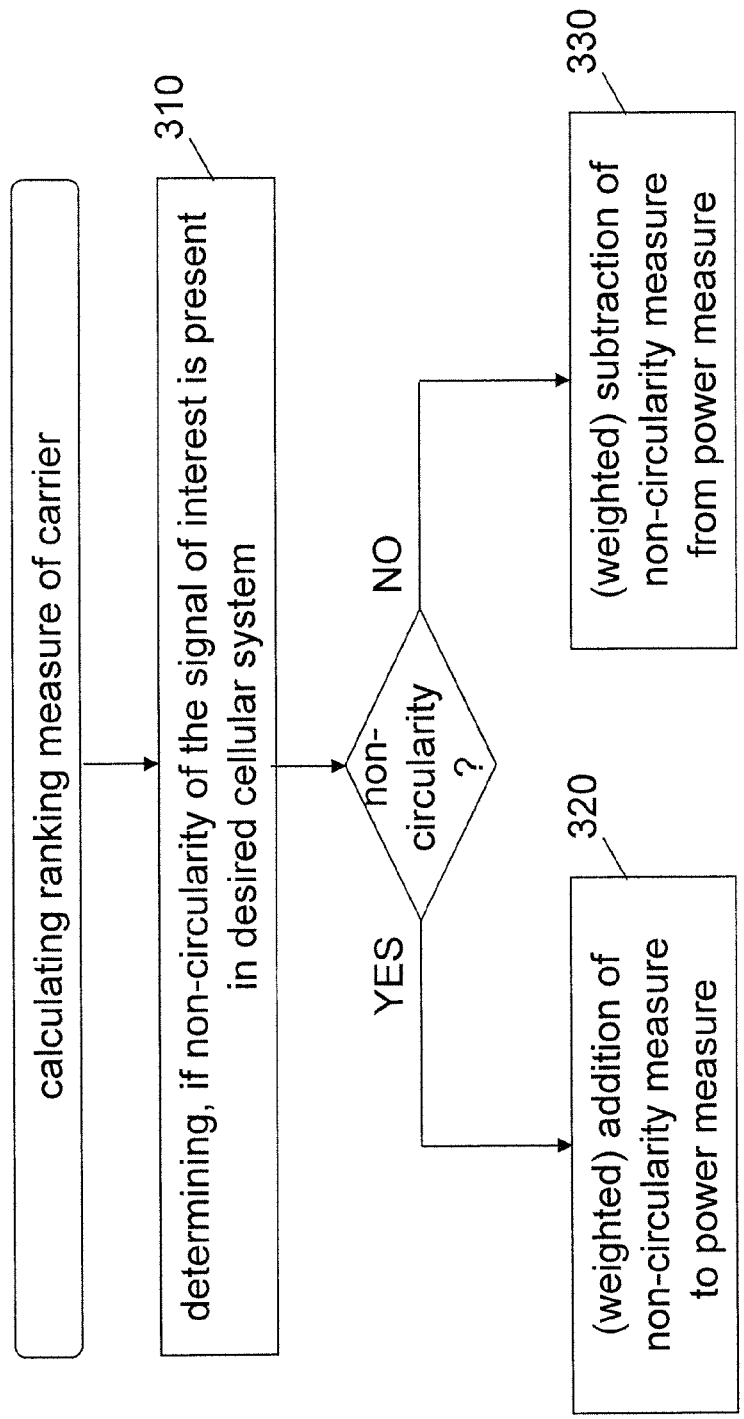
FIG. 3 shows a flowchart illustrating a procedure for calculating a ranking measure of a carrier according to exemplary embodiments of the present invention.

FIG. 3 shows a flowchart illustrating a procedure for calculating a ranking measure of a carrier according to exemplary embodiments of the present invention. Such procedure may correspond to the operation 140 according to FIG. 1.

As shown in FIG. 3, a corresponding procedure according to exemplary embodiments of the present invention comprises an operation of determining (310), if the desired cellular system has or is expected to have non-circularity in its carrier signal, i.e. its (carrier) signal of interest (e.g. a cell search and/or synchronization signal of a given cellular system), and an operation of calculating (320, 330) the ranking measure based on the determination result. In particular, the ranking measure is calculated based on an addition of the calculated non-circularity measure to the calculated power measure (320) when (it is determined that) the desired cellular system has or is expected to have non-circularity in its carrier signal, i.e. its (carrier) signal of interest, and the ranking measure is calculated based on a subtraction of the calculated non-circularity measure from the calculated power measure (330) when (it is determined that) the desired cellular system does not have or is not expected to have non-circularity in its carrier signal, i.e. signal of interest.

In the calculation operations 320 and 330 according to FIG. 3, the ranking measure may be calculated using a (normalized) addition or subtraction, respectively.

In the calculation operations 320 and 330 according to FIG. 3, the ranking measure may be calculated using a weighting of the calculated power measure and the calculated non-circularity measure.

By way of such calculation of the ranking measure, the priority of the carrier signal under consideration is increased when it originates from or belongs to the same cellular system (or type, standard, release, specification, etc. thereof) as the cellular system (or type, standard, release, specification, etc. thereof) the terminal desires to connect to or synchronize with, while the priority of the carrier signal under consideration is decreased when it originates from or belongs to a cellular system (or type, standard, release, specification, etc. thereof) other than the cellular system (or type, standard, release, specification, etc. thereof) the terminal desires to connect to or synchronize with. Thereby, the applicability of the considered carrier for synchronization with the desired cellular system is reflected in the ranking measure according to exemplary embodiments of the present invention, and it is thus enabled to prioritize those carriers, which are more likely to hold valid synchronization signals of the desired cellular system, over those carriers, which are less likely to hold valid synchronization signals of the desired cellular system.

In the present example, using the power measure and the non-circularity measure being calculated as described above, the ranking measure may be calculated as follows.

In case the desired cellular system has non-circularity in its signal of interest (e.g. a cell search and/or synchronization signal of a given cellular system), e.g. the terminal presently considering a carrier signal actually desires to connect to and synchronize with a GSM network (in which the synchronization signal is expected to have non-circular statistics), the relevant ranking measure $RSSI_{non\text{-}circular}$ could for example be calculated by $$\ln(RSSI_{non\text{-}circular}) = \ln(RSSI) + c_{non\text{-}circular} \cdot \lambda$$

wherein $c_{non\text{-}circular}$ represents a weighting value or constant determining how much weight is put onto the non-circularity measure $\lambda$. In particular, a value of $c_{non\text{-}circular}=0$ would give the normal RSSI measure, whereas a large positive value of $c_{non\text{-}circular}$ would put a high weight on the non-circularity measure.

Similarly, in case the desired cellular system does not have non-circularity in its signal of interest (e.g. a cell search and/or synchronization signal of a given cellular system), e.g. the terminal presently considering a carrier signal actually desires to connect to and synchronize with a (non-GSM) network in which the synchronization signal is expected to have circular statistics, the relevant ranking measure $RSSI_{circular}$ could for example be calculated by $$\ln(RSSI_{circular}) = \ln(RSSI) - c_{circular} \cdot \lambda$$

wherein $c_{circular}$ represents a weighting value or constant determining how much weight is put onto the non-circularity measure $\lambda$. In particular, a value of $c_{circular}=0$ would give the normal RSSI measure, whereas a large positive value of $c_{circular}$ would put a high weight on the non-circularity measure.

Accordingly, depending on the desired cellular system and the actual cellular system of the carrier under consideration, the carrier is assigned a correspondingly calculated ranking measure.

As mentioned above, an equivalent functionality may be alternatively accomplished based on operations working directly on the real and imaginary parts of the signal, i.e. based on an IQ-split notation/representation.

In this regard, a non-circularity measure may be computed based on an estimated real-valued covariance matrix of the (preconditioned) observation signal. That is, such methodology basically differs from that outlined above in the computation operation illustrated in FIG. 2.

Using an augmented real-valued notation, here termed the IQ-split notation/representation, the (preconditioned) observation signal can be expressed by $$y_{m,IQ} \triangleq \begin{bmatrix} \text{Re}\{y_m\} \\ \text{Im}\{y_m\} \end{bmatrix},$$

wherein Re{.} represents the real part thereof, and Im{.} represents the imaginary part thereof.

The non-circular statistics may be estimated by means of estimating the sample covariance matrix of the IQ-split (preconditioned) observation signal based on the M observation samples thereof $$\hat{R}_{IQ} = \frac{1}{M} \sum_{m=0}^{M-1} y_{m,IQ} y_{m,IQ}^T$$

Based on this equivalent IQ-split sample covariance matrix, a non-circularity measure may equivalently be computed in a manner similar to that described above for the complex-valued model, e.g. by a likelihood ratio test or other suitable computations.

One such alternative way of computing a non-circularity measure is based on the eigenvalues of the estimated covariance matrix. Such a method may be of particular interest for the case of scalar observations (N=1) where the IQ-split sample covariance matrix is a 2×2 real-valued matrix given by $$\hat{R}_{IQ} = \frac{1}{M} \sum_{m=0}^{M-1} y_{m,IQ} y_{m,IQ}^T = \begin{bmatrix} \hat{r}_{II} & \hat{r}_{IQ} \\ \hat{r}_{IQ} & \hat{r}_{QQ} \end{bmatrix} = V\Lambda V^T,$$

where V represents the matrix of eigenvectors and $\Lambda=\text{diag}([\lambda_1\ \lambda_2])$ represents the positive eigenvalues with $\lambda_1 \geq \lambda_2$. Accordingly, the eigenvalues may be identified thereby.

Based on the eigenvalues, an alternative non-circularity measure of the observation signal may for example be calculated as $\lambda=\ln(\lambda_1/\lambda_2)$.

As second-order matrices (i.e. 2×2 matrices) are relevant and dealt with in the presently described example, the ratio of eigenvalues $\lambda_1/\lambda_2$ may be found by $$\frac{\lambda_1}{\lambda_2} = \frac{\hat{r}_{II} + \hat{r}_{QQ} + \sqrt{(\hat{r}_{II} + \hat{r}_{QQ})^2 - 4\det(\hat{R})}}{\hat{r}_{II} + \hat{r}_{QQ} - \sqrt{(\hat{r}_{II} + \hat{r}_{QQ})^2 - 4\det(\hat{R})}},$$

$$\det(\hat{R}_{IQ}) = \hat{r}_{II}\hat{r}_{QQ} - \hat{r}_{IQ}^2,$$

wherein det(.) represents the determinant operator.

Figure 4:
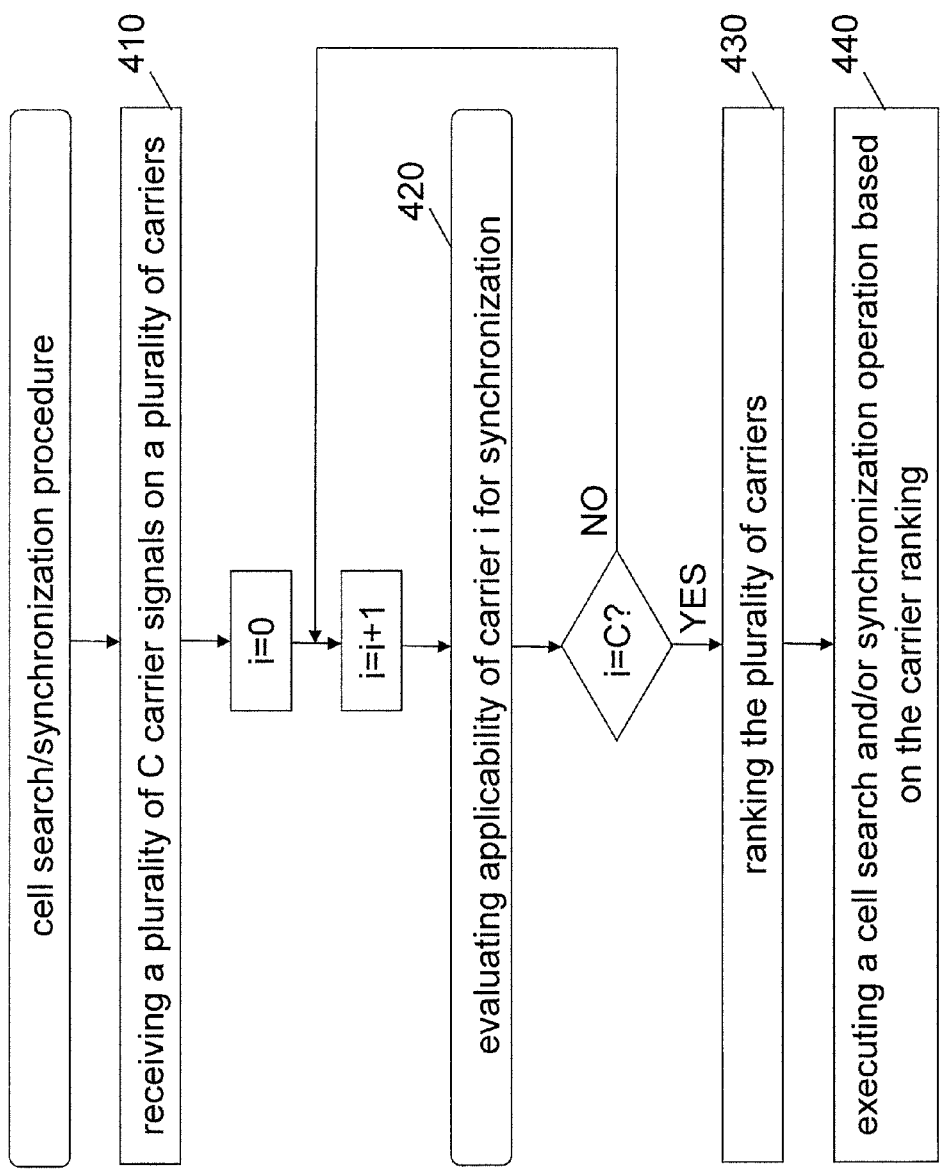
FIG. 4 shows a flowchart illustrating a cell search/synchronization procedure according to exemplary embodiments of the present invention.

FIG. 4 shows a flowchart illustrating a cell search/synchronization procedure according to exemplary embodiments of the present invention.

As shown in FIG. 4, a corresponding procedure according to exemplary embodiments of the present invention comprises an operation of receiving (410) a plurality of carrier signals on a plurality of carriers, an operation of carrying out (420) the above-described acquiring and calculating operations for each of the plurality of carrier signals (which is represented by the loop in FIG. 4), an operation of ranking (430) the plurality of carriers in accordance with their applicability for synchronization with the desired cellular system based on the calculated ranking measures of said carriers, and an operation of executing (440) a cell search and/or synchronization operation for synchronization with the desired cellular system based on the carrier ranking starting with the carrier having the highest ranking.

The operation 420 according to FIG. 4 may correspond to the procedure according to FIG. 1, including operations 110 to 140, and potentially the respective procedures according to FIGS. 2 and/or 3, respectively.

The operation 440 according to FIG. 4 may comprise conventionally known operations for the execution of cell search and synchronization, such as one or more of PSW detection, SCH detection, and BSIC verification for GSM as well as P-SCH detection, S-SCH detection and PBCH detection for LTE. Namely, based on the prioritized list of ranked carriers in accordance with the proposed ranking measure according to exemplary embodiments of the present invention, the next step of initial synchronization may then be to perform such steps starting with the carrier with the highest ranking (measure).

Accordingly, all of the thus received carrier signals are successively considered for synchronization, respectively. Then, their thus calculated ranking measures are used for establishing a ranking of the plurality of carriers, and the cell search and synchronization is executed based on such carrier ranking.

By virtue of the advanced ranking measure and the thus resulting improved ranking according to exemplary embodiments of the present invention, the likelihood of a failed attempt for synchronization on a wrong carrier (i.e. with an inappropriate synchronization signal) is reduced. This is basically achieved by incorporation of knowledge of non-/circularity properties of carrier signal.

In the above description, it is exemplarily assumed that the observation signal is sampled at one sample per data symbol. Yet, exemplary embodiments of the present invention are not limited thereby, and the observation signal may equally be sampled at an arbitrary (integer) number of samples per data symbol. Thereby, the detection of non-circular statistics may potentially be further improved.

In the above description, it is exemplarily assumed that the covariance matrix of the observation signal assumes a frequency-flat channel. Yet, exemplary embodiments of the present invention are not limited thereby, as covariance matrix estimation for frequency-selective channels may equally be involved. Thereby, the detection of non-circular statistics may be further improved.

The above-described procedures and functions may be implemented by respective functional elements, processors, or the like, as described below.

While in the foregoing exemplary embodiments of the present invention are described mainly with reference to methods, procedures and functions, corresponding exemplary embodiments of the present invention also cover respective apparatuses, network nodes and systems, including both software and/or hardware thereof.

Respective exemplary embodiments of the present invention are described below referring to FIG. 5, while for the sake of brevity reference is made to the detailed description of respective corresponding methods and operations according to FIGS. 1 to 4.

Figure 5:
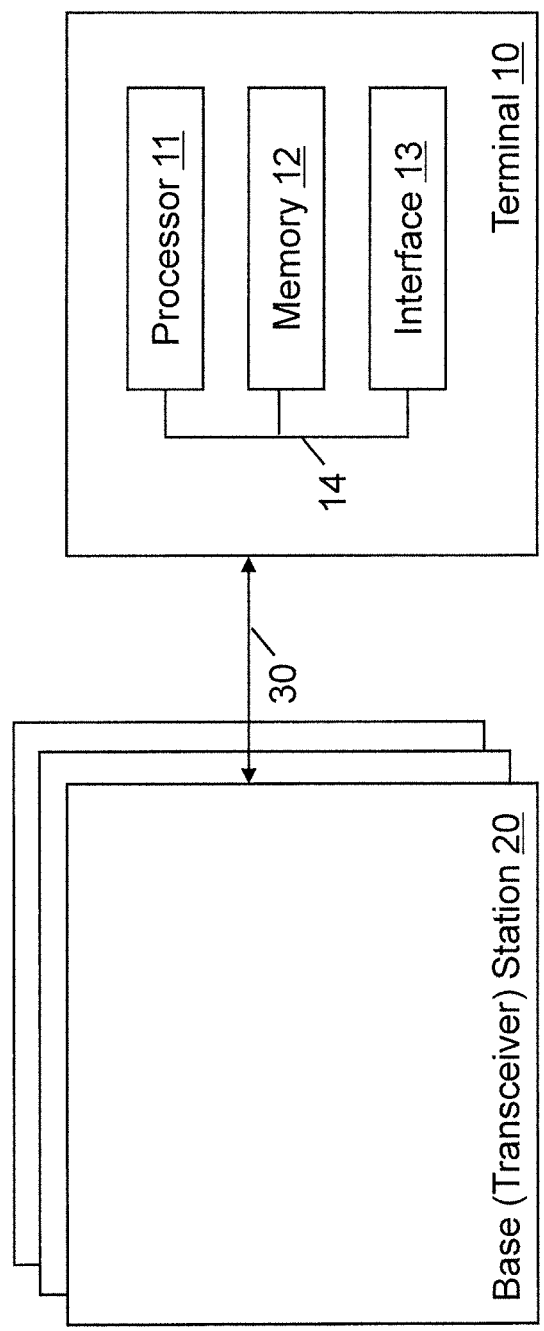
FIG. 5 shows a block diagram illustrating an apparatus and system according to exemplary embodiments of the present invention.

In FIG. 5 below, which is noted to represent a simplified block diagram, the solid line blocks are basically configured to perform respective operations as described above. The entirety of solid line blocks are basically configured to perform the methods and operations as described above, respectively. With respect to FIG. 5, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows and lines interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIG. 5, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 5 shows a block diagram illustrating an apparatus and system according to exemplary embodiments of the present invention.

In view of the above, the thus described apparatuses 10 and 20 are suitable for use in practicing the exemplary embodiments of the present invention, as described herein. The thus described apparatus 10 may represent a (part of a) terminal such as a mobile station MS or user equipment UE or a modem (which may be installed as part of a MS or UE, but may be also a separate module a chip or a chipset, which can be attached to various devices), as described above, and may be configured to perform a procedure and/or exhibit a functionality as described in conjunction with any one of FIGS. 1 to 4. The thus described apparatus 20 may represent a (part of a) network entity being operable on at least one cellular system, i.e. base station BS, a base transceiver station BTS or an access node, such as for example a NodeB, an eNB, or the like, and may be configured to transmit (e.g. broadcast) one or more carrier signals on one or more carriers, and to connect a terminal to the at least one cellular system in the context of a terminal-initiated cell search and synchronization procedure.

As shown in FIG. 5, according to exemplary embodiments of the present invention, a terminal 10 comprises a processor 11, a memory 12, and an interface 13, which are connected by a bus 14 or the like. The terminal 10 may be in communication with a base (transceiver) station 20 through a link or connection 30.

The memory 12 may store respective programs assumed to include program instructions or computer program code that, when executed by the processors 11, enables the respective electronic device or apparatus to operate in accordance with the exemplary embodiments of the present invention.

The processor 11 and/or the interface 13 may be facilitated for communication over a (hardwire or wireless) link, respectively. The interface 13 may include a suitable transceiver coupled to one or more antennas or communication means for (hardwire or wireless) communications with the linked or connected device(s), respectively. The interface 13 is generally configured to communicate with at least one other apparatus, i.e. the interface thereof. For example, the interface 13 of the terminal 10 may communicate with one or more other network entities such as base (transceiver) station 20.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the terminal 10 comprises at least one processor 11, at least one memory 12 including computer program code, and at least one interface 13 configured for communication with at least another apparatus. The processor (i.e. the at least one processor 11, with the at least one memory 12 and the computer program code) is configured to cause the apparatus 10 to perform: acquiring an observation signal for a carrier signal on a carrier which is under consideration for synchronization with a desired cellular system, calculating a power measure of the observation signal, which indicates a received power of the carrier signal, calculating a non-circularity measure of the observation signal, which indicates a non-circularity of the carrier signal, and calculating a ranking measure, which indicates an applicability of said carrier for synchronization with the desired cellular system, based on the calculated power measure and the calculated non-circularity measure.

As mentioned above, the desired cellular system and/or the actual cellular system may comprise one or more of GSM, 3G, 3.5G, CDMA, WCDMA, TD-SCDMA, HSPA, LTE, and LTE-A cellular systems. Stated in other words, the terminal (and/or the communicating base station/s) may be operable in at least one of GSM, 3G, 3.5G, CDMA, WCDMA, TD-SCDMA, HSPA, LTE, and LTE-A cellular systems.

According to exemplary embodiments of the present invention, the processor 11 may be configured to perform: preconditioning the observation signal in accordance with a modulation scheme of the carrier signal, estimating non-circular statistics of the preconditioned observation signal, if necessary, and computing a non-circularity measure based on the estimated non-circular statistics. Therein, the estimated non-circular statistics may comprise an estimation of covariance matrices of said (possibly preconditioned) observation signal, and the computed non-circularity measure may be based on a likelihood ratio test on the basis of the estimated covariance matrices. Further, the estimated non-circular statistics may also comprise imposing suitable constraints on the covariance matrix estimation based on properties of expected channel conditions, e.g. a frequency-flat channel. That is, when preconditioning is performed, the estimation and computation operations are performed on the preconditioned observation signal, while, when preconditioning is not performed, the estimation and computation operations are performed on the observation signal as such.

According to exemplary embodiments of the present invention, the processor 11 may be configured to compute the non-circularity measure based on eigenvalues of the estimated non-circular statistics or a ratio thereof. In this regard, the processor 11 may be further configured to identify the eigenvalues of the estimated non-circular statistics.

According to exemplary embodiments of the present invention, the processor 11 may be configured to perform: determining, if non-circularity of said carrier signal is expected to be present in the desired cellular system, and calculating the ranking measure based on an addition of the calculated non-circularity measure to the calculated power measure when it is determined that the desired cellular system is expected to have non-circular statistics in its carrier signal, and/or calculating the ranking measure based on a subtraction of the calculated non-circularity measure from the calculated power measure when it is determined that the desired cellular system is not expected to have non-circular statistics in its carrier signal. Therein, the ranking measure may be calculated using a weighting of the calculated power measure and the calculated non-circularity measure.

According to exemplary embodiments of the present invention, the processor 11 may be configured to perform: carrying out the acquiring and calculating operations for a plurality of carrier signals on a plurality of carriers, ranking the plurality of carriers in accordance with their applicability for synchronization with the desired cellular system based on the calculated ranking measures of the carriers, and executing a cell search and/or synchronization operation for synchronization with the desired cellular system based on the carrier ranking starting with the carrier having the highest ranking.

According to exemplary embodiments of the present invention, the memory 12 may be configured to store any data and information received via the interface 13, and/or any data and information necessary for (enabling the processor to carry out) the aforementioned operations and functions. For example, the memory 12 may contain (e.g. a database with) prestored properties of cellular systems (in particular, those in/for which the terminal is operable and/or those having carriers coexisting on the same frequency range/band as that of the cellular system in/for which the terminal is operable). Such properties of cellular systems may specifically be configured to enable a distinction between (mapping of) carrier signals and/or synchronization channels of different cellular system. In this regard, such properties of cellular systems may comprise properties in terms of a modulation scheme used for carrier signals and/or synchronization channels, a non-/circularity (e.g. non-/circular statistics in the complex plane and/or from precoding such as due to transmit diversity schemes) of carrier signals and/or synchronization channels, and the like.

According to exemplary embodiments of the present invention, the processor 11, the memory 12 and the interface 13 can be implemented as individual modules, chips, chipsets or the like, or one or more of them can be implemented as a common module, chip, chipset or the like, respectively.

According to exemplary embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, the present invention and/or exemplary embodiments thereof provide measures for cell search and synchronization. Such measures may exemplarily comprise acquiring an observation signal for a carrier signal on a carrier which is under consideration for synchronization with a desired cellular system, calculating a power measure of the observation signal, which indicates a received power of said carrier signal, calculating a non-circularity measure of the observation signal, which indicates a non-circularity of said carrier signal, and calculating a ranking measure, which indicates an applicability of said carrier for synchronization with the desired cellular system, based on the calculated power measure and the calculated non-circularity measure.

Even though the present invention and/or exemplary embodiments are described above with reference to the examples according to the accompanying drawings, it is to be understood that they are not restricted thereto. Rather, it is apparent to those skilled in the art that the present invention can be modified in many ways without departing from the scope of the inventive idea as disclosed herein.

| List of acronyms and abbreviations | |
|---|---|
| 3GPP | 3rd Generation Partnership Project |
| AWGN | Additive White Gaussian Noise |
| BPSK | Binary Phase Shift Keying |
| BS | Base Station |
| BSIC | Base Station Identity Code |
| BTS | Base Transceiver Station |
| CDMA | Code Division Multiple Access |
| eNB | evolved NodeB |
| FFT | Fast Fourier Transform |
| GLRT | Generalized Likelihood Ratio Test |
| GMSK | Gaussian Minimum Shift Keying |
| GSM | Global System for Mobile communications |
| HSPA | High Speed Packet Access |
| IEEE | Institute of Electrical and Electronics Engineers |
| LTE | Long Term Evolution |
| LTE-A | Long Term Evolution Advanced |
| MIMO | Multiple Input Multiple Output |
| MS | Mobile Station |
| OFDM | Orthogonal Frequency Division Multiplexing |
| PBCH | Physical Broadcast CHannel |
| P-SCH | Primary SCH |
| PSW | Pure Sine Wave |
| RSSI | Received Signal Strength Indicator |
| SCH | Synchronization Channel |
| S-SCH | Secondary SCH |
| TD-SCDMA | Time Division Synchronous Code Division Multiple Access |
| UE | User Equipment |
| WCDMA | Wideband Code Division Multiple Access |

What is claimed is:

1. A method comprising
acquiring an observation signal for a carrier signal on a carrier which is under consideration for synchronization with a desired cellular system,
calculating a power measure of the observation signal, which indicates a received power of said carrier signal,
calculating a non-circularity measure of the observation signal, which indicates a non-circularity of said carrier signal, and
calculating a ranking measure, which indicates an applicability of said carrier for synchronization with the desired cellular system, based on the calculated power measure and the calculated non-circularity measure.

2. The method according to claim 1, wherein calculating the non-circularity measure of the observation signal comprises
estimating non-circular statistics of said observation signal, and
computing a non-circularity measure based on the estimated non-circular statistics.

3. The method according to claim 2, wherein calculating the non-circularity measure of the observation signal further comprises
preconditioning said observation signal in accordance with a modulation scheme of said carrier signal, wherein
the non-circular statistics of the preconditioned observation signal are estimated.

4. The method according to claim 2, wherein
the estimated non-circular statistics comprises an estimation of covariance matrices of said observation signal, and
the computed non-circularity measure is based on a likelihood ratio test on the basis of the estimated covariance matrices.

5. The method according to claim 2, wherein
the non-circularity measure is computed based on eigenvalues of the estimated non-circular statistics or a ratio thereof.

6. The method according to claim 1, wherein calculating the ranking measure comprises
determining, when non-circularity of said carrier signal is expected to be present in the desired cellular system, and
calculating the ranking measure based on an addition of the calculated non-circularity measure to the calculated power measure when it is determined that the desired cellular system is expected to have non-circular statistics in its carrier signal, and
calculating the ranking measure based on a subtraction of the calculated non-circularity measure from the calculated power measure when it is determined that the desired cellular system is not expected to have non-circular statistics in its carrier signal, wherein
the ranking measure is calculated using a weighting of the calculated power measure and the calculated non-circularity measure.

7. The method according to claim 1, further comprising
carrying out the acquiring and calculating operations for a plurality of carrier signals on a plurality of carriers,
ranking the plurality of carriers in accordance with their applicability for synchronization with the desired cellular system based on the calculated ranking measures of said carriers, and
executing a cell search and/or synchronization operation for synchronization with the desired cellular system based on the carrier ranking starting with the carrier having the highest ranking.

8. The method according to claim 1, wherein
non-circularity of said carrier signal exists in the complex plane or any other space over which signal precoding is done, and/or
said carrier signal comprises a synchronization signal of the actual cellular system of said carrier, and/or
said carrier signal has a frequency within a predetermined frequency range of the desired cellular system, wherein said predetermined frequency range is configurable to accommodate multiple cellular systems or carrier signals thereof, and/or
the calculated power measure comprises a received signal strength indicator value of said observation signal.

9. The method according to claim 1, wherein
the method is operable at or by a terminal, user equipment or mobile station being operable at least in the desired cellular system, and/or
the desired cellular system and the actual cellular system comprise one or more of GSM, 3G, 3.5G, CDMA, WCDMA, TD-SCDMA, HSPA, LTE, and LTE-A cellular systems.

10. An apparatus comprising
at least one processor,
at least one memory including computer program code, and
at least one interface configured for communication with at least another apparatus, the at least one processor, with the at least one memory and the computer program code, being configured to cause the apparatus to perform:

acquiring an observation signal for a carrier signal on a carrier which is under consideration for synchronization with a desired cellular system, calculating a power measure of the observation signal, which indicates a received power of said carrier signal, calculating a non-circularity measure of the observation signal, which indicates a non-circularity of said carrier signal, and calculating a ranking measure, which indicates an applicability of said carrier for synchronization with the desired cellular system, based on the calculated power measure and the calculated non-circularity measure.

11. The apparatus according to claim 10, the at least one processor, with the at least one memory and the computer program code, being further configured to cause the apparatus to perform:

estimating non-circular statistics of said observation signal, and computing a non-circularity measure based on the estimated non-circular statistics.

12. The apparatus according to claim 11, the at least one processor, with the at least one memory and the computer program code, being further configured to cause the apparatus to perform preconditioning said observation signal in accordance with a modulation scheme of said carrier signal, wherein the non-circular statistics of the preconditioned observation signal are estimated.

13. The apparatus according to claim 11, wherein the estimated non-circular statistics comprises an estimation of covariance matrices of said observation signal, and the computed non-circularity measure is based on a likelihood ratio test on the basis of the estimated covariance matrices.

14. The apparatus according to claim 11, wherein the non-circularity measure is computed based on eigenvalues of the estimated non-circular statistics or a ratio thereof.

15. The apparatus according to claim 10, the at least one processor, with the at least one memory and the computer program code, being further configured to cause the apparatus to perform:

determining, when non-circularity of said carrier signal is expected to be present in the desired cellular system, and calculating the ranking measure based on an addition of the calculated non-circularity measure to the calculated power measure when it is determined that the desired cellular system is expected to have non-circular statistics in its carrier signal, and calculating the ranking measure based on a subtraction of the calculated non-circularity measure from the calculated power measure when it is determined that the desired cellular system is not expected to have non-circular statistics in its carrier signal, wherein the at least one processor, with the at least one memory and the computer program code, being further configured to cause the apparatus to calculate the ranking measure using a weighting of the calculated power measure and the calculated non-circularity measure.

16. The apparatus according to claim 10, the at least one processor, with the at least one memory and the computer program code, being further configured to cause the apparatus to perform:

carrying out the acquiring and calculating operations for a plurality of carrier signals on a plurality of carriers, ranking the plurality of carriers in accordance with their applicability for synchronization with the desired cellular system based on the calculated ranking measures of said carriers, and executing a cell search and/or synchronization operation for synchronization with the desired cellular system based on the carrier ranking starting with the carrier having the highest ranking.

17. The apparatus according to claim 10, wherein non-circularity of said carrier signal exists in the complex plane or any other space over which signal precoding is done, and/or said carrier signal comprises a synchronization signal of the actual cellular system of said carrier, and/or said carrier signal has a frequency within a predetermined frequency range of the desired cellular system, wherein said predetermined frequency range is configurable to accommodate multiple cellular systems or carrier signals thereof, and/or the calculated power measure comprises a received signal strength indicator value of said observation signal.

18. The apparatus according to claim 10, wherein the apparatus is operable as or at a terminal, user equipment, mobile station or modem being operable at least in the desired cellular system, and/or the desired cellular system and the actual cellular system comprise one or more of GSM, 3G, 3.5G, CDMA, WCDMA, TD-SCDMA, HSPA, LTE, and LTE-A cellular systems.

19. A computer program product comprising a non-transitory computer readable storage medium configured to store computer-executable computer program code which, when the program code is run on a computer, is configured to cause the computer to carry out the method according to claim 1.

* * * * *